United States Patent [19]

Keenan

[11] 4,391,293

[45] Jul. 5, 1983

[54] PACKING FOR EQUALIZING RESERVOIR CUT-OUT VALVE

[75] Inventor: John R. Keenan, Watertown, N.Y.

[73] Assignee: General Signal Corp., Stamford, Conn.

[21] Appl. No.: 217,872

[22] Filed: Dec. 18, 1980

[51] Int. Cl.³ .................... F16K 51/00; F16K 31/122
[52] U.S. Cl. ...................................... 137/312; 92/86;
251/62; 251/63.4; 251/63.5; 251/363;
251/DIG. 1; 277/29
[58] Field of Search ................... 137/312; 92/86, 86.5;
251/62, 63.4, 63.5, 63.6, 214, DIG. 1, 363;
277/29

[56] References Cited

U.S. PATENT DOCUMENTS

| | | | |
|---|---|---|---|
| 2,713,989 | 7/1955 | Bryant | 251/DIG. 1 |
| 2,843,434 | 7/1958 | Orloff et al. | 277/29 |
| 3,063,423 | 11/1962 | Riordan | 92/86 |
| 3,080,883 | 3/1963 | Allen | 251/363 |
| 3,631,887 | 1/1972 | Anton et al. | 251/63.5 |
| 3,958,592 | 5/1976 | Wells et al. | 251/63.6 |
| 3,981,479 | 9/1976 | Foster et al. | 251/63.6 |
| 4,098,171 | 7/1978 | Haytayan | 251/63.5 |

Primary Examiner—George L. Walton
Attorney, Agent, or Firm—Leitner, Palan, Martin & Bernstein

[57] ABSTRACT

The packing for elements of a valve subject to reversal of differential pressure includes a pair of spaced packings with a recess there-between connected to atmosphere to eliminate reversal of differential pressure across individual packings of the pairs.

15 Claims, 5 Drawing Figures

PACKING FOR EQUALIZING RESERVOIR CUT-OUT VALVE

BACKGROUND OF THE INVENTION

The present invention relates generally to valve packing and more specifically to an improved valve packing wherein the valve packing is exposed to reversal of pressure differentials.

A valve generally includes a housing with a plurality of members or elements therein. The interior elements are sealed, whether they are stationary or movable, by packings. Generally the packings are exposed to a single polarity of pressure differentials in the normal operation of the valve. For a selected group of valves, the packings may be subjected to a reversal of pressure differentials across the packings. One such valve is an equalizing reservoir cut-out valve 10 illustrated in FIGS. 1–3.

The valve 10 includes a housing 12 having an equalizing reservoir control pipe port 14, an equalizing reservoir port 16, and a control port 18. A ported sleeve 20 is received within bore 22 of housing 12 and includes an annular port 24 communicating the interior of the sleeve 20 to the equalizing reservoir port 16. A pair of annular recesses 26 and 28 in the sleeve 20 are adjacent opposite sides of the annular port 24 and include packings 30 and 32, respectively, illustrated as O-rings. The packings 30 and 32 seal the annular port 24 from the control port 18 and the equalizing reservoir control pipe port 14. Sleeve 20 includes a valve seat 34 which forms a check valve in combination with disc 36 which is biased closed by spring 38. A plunger 40 is slidably received within the sleeve 20 and includes ports 42 interconnecting the check valve and the annular port 24. An annular recess 44 in the plunger 40 includes a packing 46 to seal the control port 18 from the interior ports 42 and 22.

The operation of the equalizing reservoir cut-out valve 10 will now be described. When a high pressure control signal is applied at control port 18 as indicated by the arrow therein in FIG. 1, the plunger 40 is moved to the left opening disc 36 of the check valve. This allows communication between the equalizing reservoir control pipe port 14 and the equalizing reservoir port 16. Generally high pressure fluid from the equalizing reservoir control port 14 will flow through seat 34, port 42 and annular port 24 to the equalizing reservoir port 16 as indicated by the arrows therein. If the pressure in the equalizing reservoir is greater than that of the equalizing reservoir control pipe, the flow between ports 16 and 14 is reversed. In either case, the high pressure signal at control port 18 leaks into annular recesses 28 and 44 and positions the packings 32 and 46 against the left side wall of the annular recesses 28 and 44, respectively. This provides a tight seal preventing the high pressure fluid at port 18 from entering the interior of the valve structure.

Once the high pressure control signal is removed from control port 18, it is generally vented to atmosphere. The flow of fluid from equalizing reservoir control pipe 14 through the valve to the equalizing reservoir port 16 will close the check valve and force the plunger 40 back to the right. The pressure in the equalizing reservoir will enter through equalizing reservoir port 16, annular port 44 and port 42 to create a high pressure between the interior of the plunger 40 and the disc 36 of the check valve. This pressure will leak into the annular recesses 28 and 44 and position the packings 32 and 46, respectively, against the right wall of their annular recesses. This will cause the packings 32 and 46 to seal and prevent fluid from the equalizing reservoir to seep into the control port 18. This condition is illustrated in FIG. 2. If the pressure at equalizing reservoir port 16 is greater than the pressure equalizing reservoir control pipe port 14 plus the force of spring 38, the disc 36 of the check valve will open allowing flow of fluid from the equalizing reservoir port 16 to the equalizing reservoir control pipe port 14. Disc 36 of the check valve will seat itself once the pressure at the equalizing reservoir port 16 equals the pressure of the equalizing reservoir control pipe port 14 plus the force of spring 38.

From the description of FIGS. 1 and 2, it can be seen that the equalizing reservoir cut-out valve 10 includes packings 32 and 46 which are subjected to reversal of pressure differentials thereacross. The packings oscillate between the walls of the recesses in which they are located in response to the pressure differential reversals to provide appropriate seals. After several reversals, the lubrication of the packings is reduced, the compression set of the packings causes decreased sealing contact force, and the recesses in which the packings lie possibly corrode. This results in the packing not moving into the correct sealing position against the side wall of the recesses and equalizing pressure will leak past the packings. This may cause an over-application of brakes if the valve is used as an equalizing reservoir cut-out valve. As is illustrated in FIG. 3, the packings 32 and 46 have moved from a sealed position against the left walls of the respective annular recesses, 28 and 44, respectively, but have not traveled completely to the right wall of the recesses to form a seal. The fluid at equalizing reservoir port 16 leaks to the control port 18. This effectively reduces the efficiency of the equalizing reservoir.

One solution of the prior art to maintain a packing within its annular recess is to provide a port between the base of the recess and one side of the valve structure. This is illustrated in U.S. Pat. No. 2,713,989 to Bryant. Although this method may be used in certain valve configurations, it would be totally inoperable wherein the packing is subjected to reversal of differential pressures. For the differential pressure situation, Bryant illustrates in FIGS. 4 and 5 the introduction of the fluid to aid the movement of the packing within its recess so as to be positioned against the appropriate wall of the recess to form a seal. Although such an arrangement may be appropriate for the valve seat of a plunger, it does not have application to packings in a non-valve seat configuration where they are subject to reversals of differential pressures.

SUMMARY OF THE INVENTION

An object of the present invention is to provide a new packing configuration for eliminating differential pressure reversals across a packing.

Another object of the present invention is to provide a valve packing structure which is subject to differential pressure reversals and whose seals are not affected by such reversals.

A further object of the present invention is to provide an equalizing reservoir valve whose packings are not affected by the differential pressure reversals experienced by the valves.

These and other objects of the present invention are attained by adding a second packing or substituting a pair of packings for the single packing in a valve with a space between the pair of packings which is connected to a fixed value of pressure thereby eliminating the differential pressure reversal across each of the respective packings which is experienced across the pair of packings. The fixed value of pressure is the atmosphere or the lowest pressure to which the packings are expected to be exposed. The pair of packings may be between the valve seat sleeve and the housing as well as between a plunger and the housing. This improved valve structure is specifically applicable to equalizing reservoir cut-out valves.

Other objects, advantages and novel features of the present invention will become apparent from the following detailed description when considered in conjunction with the accompanying drawings.

DESCRIPTION OF THE PREFERRED EMBODIMENTS

Figure 3:
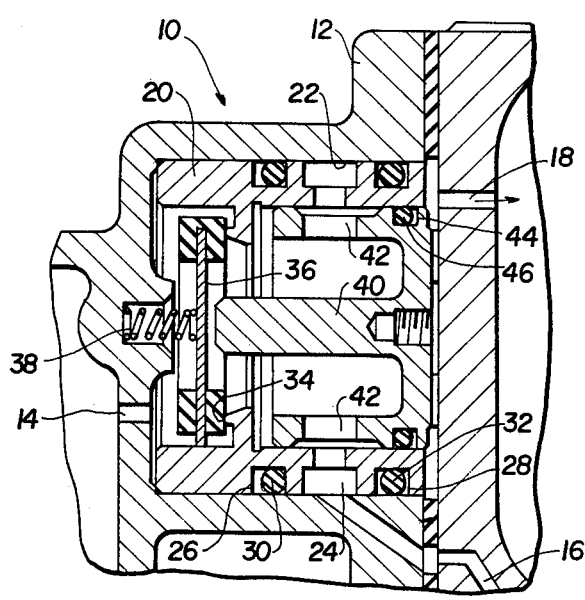
FIG. 3 is a cross-sectional view of the prior art equalizing reservoir valve of FIGS. 1 and 2 with the packings in a failed position.
Figure 4:
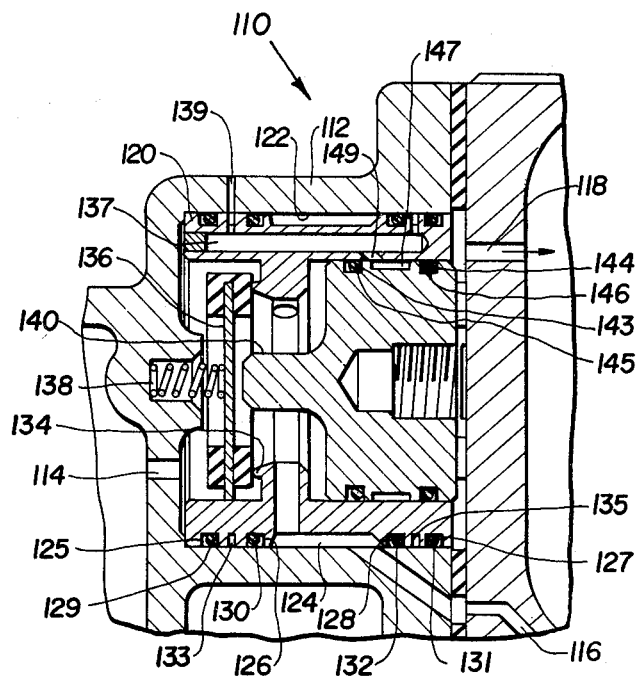
FIG. 4 is a cross-sectional view of a valve structure incorporating the principles of the present invention in a first operable position.
Figure 5:
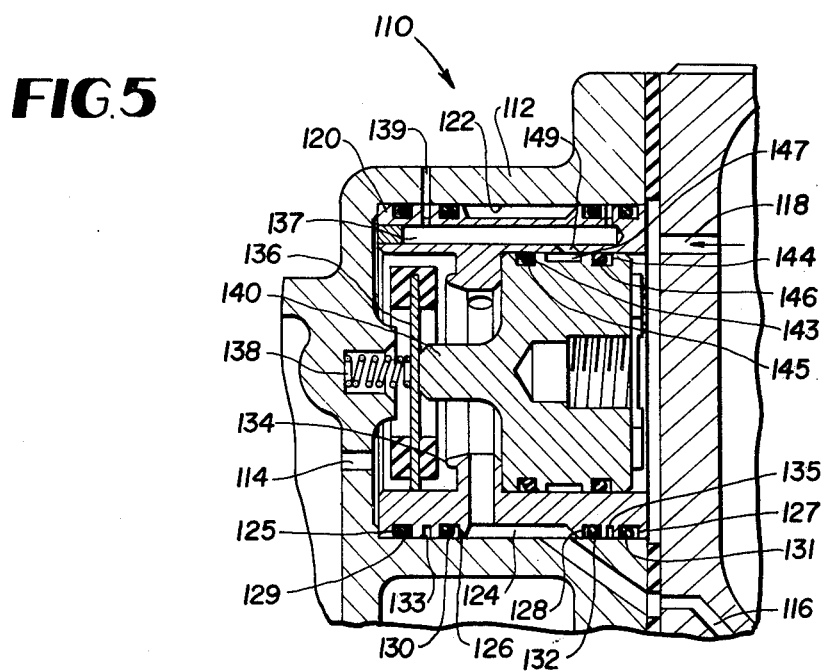
FIG. 5 is a cross-sectional view of a valve with FIG. 5 in a second operable position.

A valve 110 incorporating the principles of the present invention is illustrated in FIGS. 4 and 5 as an improved equalizing reservoir cut-out valve. Those portions of the valve 110 which are similar if not identical to the prior art valve 10 of FIGS. 1–3 will have the same last two digits. The odd number numerals in FIGS. 4 and 5 refer to new portions of the valve structure compared to that of FIGS. 1–3. The improved valve 110 includes a housing 112 having an equalizing reservoir control pipe port 114, an equalizing reservoir port 116 and a control port 118. A ported sleeve 120 lies within bore 122 of the housing 112. An annular port 124 connects the interior of the sleeve 120 to the equalization reservoir port 116.

Recesses 126 and 128 on the exterior of sleeve 120 include packings 130 and 132 therein, respectively. Additionally, annular recesses 125 and 127 in sleeve 120 include packings 129 and 131 therein, respectively. Additional annular recesses 133 and 135 lying between annular recesses 125 and 126 and 127 and 128, respectively, are connected to a channel 137 which in turn is connected through recess 133 to a vent port 139 in housing 112. The sleeve 120 includes a valve seat 134 of the check valve which also includes disc 136. A spring 138 biases the disc 136 closed against the valve seat 134.

Interior the sleeve 120 is a plunger 140. On the exterior of the plunger 140 are annular recesses 143 and 144 in which lie packings 145 and 146. An annular recess 147 also in the exterior of the plunger 140 lies between the recesses 143 and 144. A port 149 interconnects the annular recess 147 to the channel 137 which is connected to the vent port 139 in the housing 112.

Figure 1:
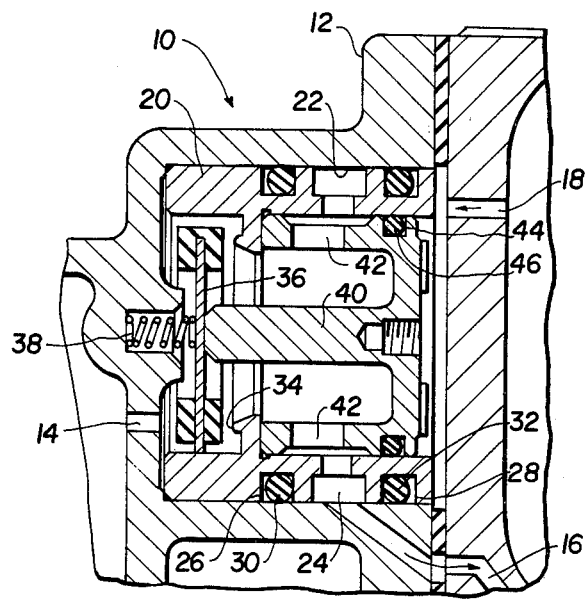
FIG. 1 is a cross-sectional view of the prior art equalizing reservoir valve in one operable position.
Figure 2:
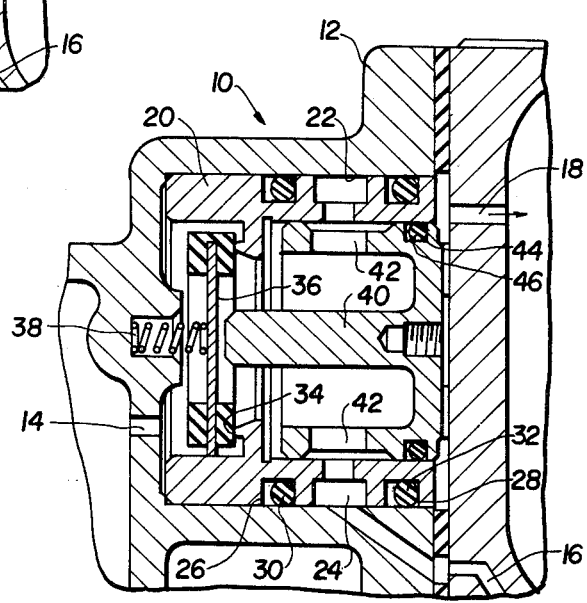
FIG. 2 is a cross-sectional view of the prior art equalizing reservoir valve of FIG. 1 in a second operable position.

The major modification between the valve 110 of FIGS. 4 and 5 and valve 10 of FIGS. 1–3 is the inclusion of a second packing 129, 131 and 147 as part of a pair with the original packings 130, 132 and 146 and the inclusion of recesses 133, 135 and 147 connected to an atmospheric vented system including port 149, channel 137 and vent port 139. As will be explained more fully hereafter the additional packing and the vent between the packings connects one side of each of the packings to a fixed value of pressure for eliminating differential pressure reversal across any individual packing even though the pair of packings experiences a differential pressure reversal.

The addition of the second packing 145 and recess 143 and the venting recess 147 to the exterior of the plunger 140 required modification of the plunger base and elimination of the port 42 therein. This required repositioning the port in the sleeve 120 between the check valve and annular port 144. By restructuring the plunger 140, the same housing 120 may be used for valve 110 as for valve 10. Although it should be noted that the original plunger configuration 40 could be used requiring extending the axial length of the plunger to include a port equivalent to port 42 of FIG. 1.

The valve 110 as illustrated in FIG. 4 is in its stable condition wherein the pressure at equalizing reservoir control pipe port 114 is substantially equal to the pressure at the equalization reservoir port 116. Also no control signal is provided at control port 118 and it is substantially at atmospheric pressure. In this condition packings 131 and 146 have no differential pressure there-across since both sides are substantially at atmospheric pressure. The packings 131 and 146 are against the left side of the recesses 127 and 144, respectively, as a result of a pre-pressurized condition. Packings 130, 132 and 145 are subjected on a first side to the pressure at equalization reservoir port 116 and their other side is subjected to atmospheric pressure via recesses 133, 135, 147, channel 137 and vent port 139. Packing 129 is subjected to the pressure at equalization reservoir control pipe port 114 on one side and the other side is subjected to atmospheric pressure via recess 133 and vent port 139. The packings 129, 132, and 145 lie against the right wall of recesses 125, 128 and 143, respectively, and packing 130 lies against the left wall of recess 126. Thus in FIG. 1, all of the packings experience a packing differential towards the vented recesses or no pressure differential at all.

To charge an equalization reservoir connected to equalization reservoir port 116, a control pressure is applied to control port 118. This forces the plunger 140 to the left into engagement with disc 136 to open the check valve. This allows fluid from the equalizing reservoir control pipe port 114 to enter the valve and be dispensed through to the equalizing reservoir port 116. In this operable condition or state, packings 131 and 146 experience a rise in pressure from the control port 118 on their right side thus creating a pressure differential across the packings 131 and 146. Since there was previously no pressure differential, this pressure differential is not a creation of a reversal of a pressure differential. The pressure differential across the other packings 129, 130, 132 and 145 may be reduced though not reversed.

Since one side of each packing is connected to atmosphere, the pressure differential across any packing is never reversed. This is true even though the differential pressure across a respective pair of packings may be reversed. For example, in FIG. 4 the pressure differential across packings 131 and 132 and 145 and 146 is from port 116 to port 118 whereas in FIG. 5 the pressure differential across these pairs of packings is reversed, namely from port 118 to 116. Since the pressure differential across any individual packing is not changed, the packing does not move from the respective wall of its recess and consequently the seal is not broken even though the pressure differential across a pair of packings may be reversed.

Although it is indicated that the vent port 139 in the housing is vented to atmosphere, this system may be designed such that the vent port 139 is connected to a fixed value of pressure which will represent the lowest expected pressure to be applied to any of the ports 114, 116 or 118. Although the addition of a second packing and vented recess or the replacement of a single packing with a pair of packings and a vented recess therebetween is shown as being used in an equalizing reservoir cut-out valve, this principle may be included in other valves wherein a packing is subjected to reversal of differential pressure.

From the preceding description of the preferred embodiments it is evident that the objects of the invention are attained in that an improved valve packing is shown which is immune to differential pressure reversals. Although the invention has been described and illustrated in detail, it is to be clearly understood that the same is by way of illustration and example only and is not to be taken by way of limitation. The spirit and scope of this invention are to be limited only by the terms of the appended claims.

What is claimed:

1. In a valve having a housing, a bore in said housing, a valve seat in said bore, a first packing means providing a seal between said valve seat and said housing, said first packing means being subjected to differential pressure reversals across that packing means, the improvement comprising:
   a second, separate packing means spaced from said first packing means and adjacent thereto between said valve seat and said housing and providing a seal between said valve seat and said housing; and
   means for eliminating differential pressure reversals across said first and second packing means when said valve experiences differential pressure reversals therein by connecting the space between said first and second packing means to a fixed value of pressure such that said first and second packing means do not oscillate in response to said differential pressure reversals.

2. The valve according to claim 1 wherein said fixed value of pressure is at or below the lowest expected pressure to which said packings are to be exposed.

3. The valve according to claim 1 wherein said fixed value of pressure is atmosphere.

4. The valve according to claim 1 wherein said first member is a plunger movable in said bore.

5. The valve according to claim 1 wherein said first and second packing means include O-rings and lie in spaced first and second annular recesses, respectively.

6. In an equalizing reservoir cut-out valve having a housing, a bore in said housing, an equalizing reservoir control pipe port, an equalizing reservoir port, a control port, a check valve for permitting flow from said reservoir port to said control pipe port, a valve seat for said check valve in a bore in said housing, a plunger responsive to pressure at said control port for opening said check valve to permit flow from said control pipe port to said reservoir port, and packing means subject to differential pressure reversals between said reservoir port and said control port, the improvement being said packing means which comprises:
   a first packing means being exposed on a first side to said control port;
   a second, separate packing means spaced from said first packing and adjacent thereto between said valve seat and said housing and being exposed on a first side to said reservoir port, wherein said first and second packing means seal said valve seat to said housing;
   means interconnecting the space between said first and second packing means to a fixed value of pressure for eliminating differential pressure reversals across each of said first and second packing means when said valve housing experiences differential pressure reversals therein.

7. The equalizing reservoir cut-out valve according to claim 6 wherein said fixed value of pressure is at or below the lowest expected pressure to which said packings are to be exposed.

8. The valve according to claim 6 wherein said fixed value of pressure is atmosphere.

9. The equalizing reservoir cut-out valve according to claim 8 wherein said first and second packing means include O-rings and lie in spaced first and second recesses, respectively.

10. In a valve having a housing, a bore in said housing, a valve seat in said bore, a bore in said valve seat, a plunger movable in said bore in said valve seat, a first packing means providing a seal between said valve seat and said housing, said first packing means being subjected to differential pressure reversals, the improvement comprising:
   a second packing means spaced from said first packing means and adjacent thereto between said valve seat and said housing and providing a seal between said valve seat and said housing;
   a means for eliminating differential pressure reversals across said first and second packing means by connecting the space between said first and second packing means to a fixed value of pressure outside said housing;
   third and fourth adjacent packing means, spaced along said plunger for sealing said plunger and said bore in said valve seat; and
   a channel interconnecting said space between said third and fourth packing means to said space between said first and second packing means which in turn is connected to said means for eliminating differential pressure reversals.

11. The valve according to claim 10, wherein said first, second, third and fourth packing means are annular and said first and second packing means have a radius larger than said third and fourth packing means, and said channel is annular and disposed between said first and second packing means, and said third and fourth packing means.

12. The valve according to claim 10 further including a ported sleeve in said bore of said housing, an equalization reservoir port in said housing connected to said ported sleeve by an annular port, wherein said channel is connected to said annular port, and said annular port is connected to said space between said first and second packing means.

13. The valve according to claim 12 further including fifth and sixth spaced apart adjacent packing means for providing a seal between said valve seat and said housing and said space between said fifth and sixth packing means being connected to said annular port, wherein said first and second packing means, and said fifth and sixth packing means are disposed on either longitudinal side of said annular port.

14. In a valve having a housing, a bore in said housing, a valve seat in said bore, a first packing means providing a seal between said valve seat and said housing, said first packing means being subjected to differential pressure reversals, the improvement comprising:
- a second packing means spaced from said first packing means and adjacent thereto between said valve seat and said housing and providing a seal between said valve seat and said housing;
- means for eliminating differential pressure reversals across said first and second packing means by connecting the space between said first and second packing means to a fixed value of pressure; and
- wherein said valve includes a plunger movable in a bore in said valve seat, a pair of packing means spaced along said plunger, and a channel interconnecting the space between said pair of packing means to said means for eliminating differential pressure reversals.

15. In an equalizing reservoir cut-out valve having a housing, a bore in said housing, an equalizing reservoir control pipe port, an equalizing reservoir port, a control port, a check valve for permitting flow from said reservoir port to said control pipe port, a valve seat for said check valve in a bore in said housing, a plunger responsive to pressure at said control port for opening said check valve to permit flow from said control pipe port to said reservoir port, and packing means subject to differential pressure reversals between said reservoir port and said control port, the improvement being said packing means which comprises:
- a first packing means being exposed on a first side to said control port;
- a second packing means spaced from said first packing means and adjacent thereto between said valve seat and said housing and being exposed on a first side to said reservoir port, wherein said first and second packing means seal said valve seat to said housing;
- means interconnecting the space between said first and second packing means to a fixed value of pressure for eliminating differential pressure reversals across each of said first and second packing means; and
- wherein said plunger slides in a bore in said valve seat, and including a third and fourth adjacent packing means spaced along said plunger for sealing said plunger and said bore in said valve seat, a first side of said third packing means being exposed to said control port and a first side of said fourth packing means being exposed to said reservoir port, and said means also interconnects the space between said third and fourth packing means to said fixed valve of pressure for eliminating differential pressure reversals across each of said third and fourth packing means.

* * * * *